United States Patent

[11] 3,627,200

[72] Inventor Jesse W. Sadler
P. O. Box 489, Richland, Wash. 99352
[21] Appl. No. 65,028
[22] Filed Aug. 19, 1970
[45] Patented Dec. 14, 1971

[54] MECHANICAL GOLF HANDICAPPER
3 Claims, 3 Drawing Figs.
[52] U.S. Cl. ................................................. 235/88,
235/78, 235/83, 116/133
[51] Int. Cl. ................................................. G06c 3/00
[50] Field of Search ........................................ 235/88, 83,
78, 116; 116/133

[56] References Cited
UNITED STATES PATENTS
2,325,761 8/1943 Fleischer .................... 235/88
2,806,650 9/1957 Mead ........................... 235/88
3,106,030 10/1963 Pelosi ........................... 40/70
3,363,836 1/1968 Lee .............................. 235/78
3,419,973 1/1969 Manotas et al. ............. 35/31
3,434,658 3/1969 Goldstein ..................... 235/84

Primary Examiner—Stephen J. Tomsky
Attorney—Keith S. Bergman

ABSTRACT: A circular slide rule to mechanically determine golf handicaps. Circular scales are arranged on two discs adjustably mechanically related by a particular course par score to allow the reading of a golfer's handicap through one finder window when his score be arrayed under a second finder window both defined in a third disc.

PATENTED DEC 14 1971 3,627,200

Jesse W. Sadler,
INVENTOR

BY
ATTORNEY.

MECHANICAL GOLF HANDICAPPER

BACKGROUND OF INVENTION

1. Field of Invention

This invention relates generally to a manually operated, mechanical golf handicapper and more particularly to such a device in the form of a circular slide rule.

2. Description Of Prior Art

Heretofore additive slide rules for various purposes have become known though not as a handicapping device for golf scoring.

Similarly various manually operated, mechanical devices to determine numerical incidents associated with the game of golf have become known, such as to determine the distance of a particular hole, to determine the nature of a particular club for a particular shot and to determine the total number of shots for a particular hole or for a particular game. Mechanical devices, however, in the nature of an additive circular slide rule having mechanically linked adjustment for the par of an individual course to determine a golfer's handicap have not become known.

The instant invention differs from this art in providing such an additive circular slide rule with releasably mechanically linked elements adjustable to the par of a particular course to determine a golfer's handicap when given his score or the inverse.

SUMMARY OF INVENTION

My invention comprises a circular back support disc adjacent a somewhat smaller circular handicap disc carried within an annular par disc, both adjacent a faceplate having two readout windows. Circular scales are provided on the handicap disc and par disc. The two discs are mechanically related so that the carried scales may be adjustably positioned with varying angular orientation so that a golfer's handicap may be read out one indicator window on the faceplate when the other indicator window shows the golfer's score. All discs are pivotably supported upon a central releasably positionable axle for simple operator manipulation.

In providing such a mechanism it is the purpose of my invention to create an additive-type circular slide rule to indicate a golfer's handicap when his score on a particular course with a given par score is known.

It is a further object of my invention to provide such a mechanism that is of new and novel design, of rugged and durable nature, of simple and economic manufacture and one otherwise well adapted to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as required.

BRIEF DESCRIPTION OF DRAWINGS

In the accompanying drawings which form a part of this specification and wherein like numbers of reference refer to similar parts throughout.

DESCRIPTION OF PREFERRED EMBODIMENT

Figure 1:
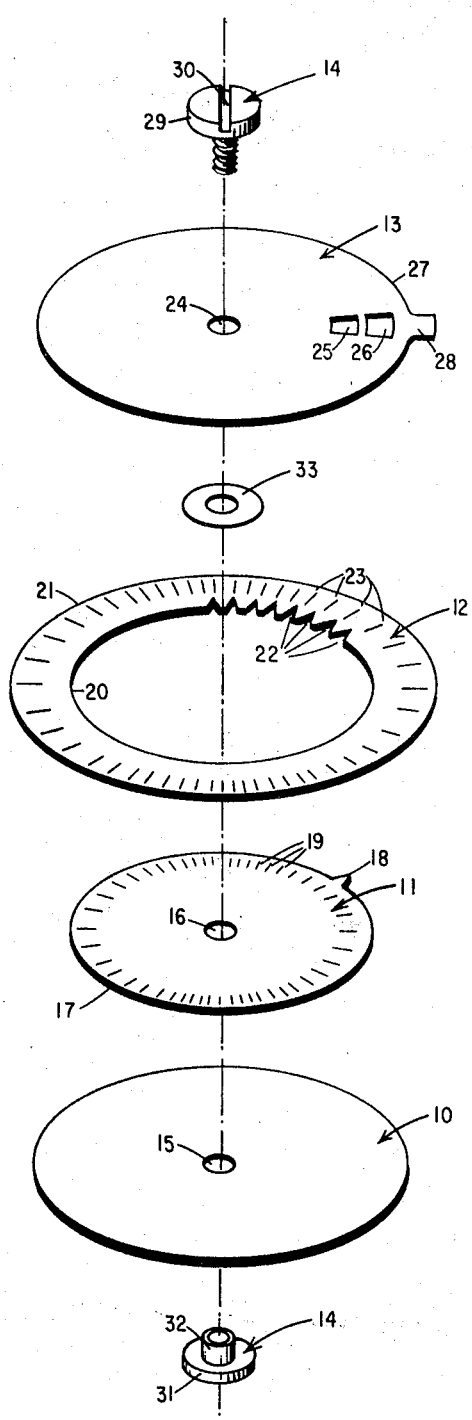
FIG. 1 is an expanded isometric view of the various elements of my invention showing their configuration and relationship.

Referring now to the drawings in more detail and particularly to that of FIG. 1 it will there be seen that my invention comprises generally back support disc 10 adjacent smaller handicap disc 11 within annular par disc 12 adjacent faceplate 13, the whole being pivotably joined in adjacency by compound axle element 14.

Back disc 10 is a planar circular element of some few inches in diameter and of sufficient thickness to be reasonably rigid. It has central axially aligned hole 15 of appropriate size to provide a rotatable fit upon axle element 14. The purpose of this element is merely supportive and protective.

Handicap disc 11 is a planar circular element somewhat less in diameter than back disc 10. It is provided with medial axially aligned hole 16 to provide a rotatable fit upon the compound axle element. About is periphery 17 the handicap disc provides a single radially extending spur 18 adapted to mate within one of the notches of the par disc.

The handicap disc is provided with circular score scale 19 at spaced distance inwardly adjacent its periphery 17. This scale preferably provides 48 equally spaced scale indicators at an angular distance of 7° and 20' from each other. Each of these scale indicators is marked consecutively with the following numbers: 0, 1, 2, 2, 3, 4, 5, 6, 7, 8, 9, 10, 11, 13, 14, 14, 15, 16, 17, 18, 19, 20, 21, 22, 23, 24, 25, 25, 26, 27, 28, 29, 30, 31, 31, 32, 33, 34, 35, 36, 37, 38, 39, 40, and 41. The angular position of spur 18 is related to the angular position of indicators in scale 19 in relation with the notches and scale provided by par annulus 12. Par disc 12 is a planar annulus having an internal periphery 20 adapted to fit immediately outwardly adjacent external periphery 17 of handicap disc 11. External periphery 21 is somewhat greater in size to form an annulus of some width, sufficient to carry the scales required to be carried by it. Normally the diameter of the external periphery will be somewhat greater than the diameter of back disc 10 to allow easier manipulation of the device in setting.

The internal periphery of the par annulus is provided with a plurality of notches 22 each adapted to accept spur 18 of the score disc in a nice fit. The annular distance between the inwardly extending apexes of the notches should be the same annular distance as that between scale elements of the handicap disc—7° 20' in this instance. The annular relationship of these notches to the par annulus scale is material in relationship to the spur and scale of score disc 11.

The upper (as FIG. 1 is normally viewed) face or par disc 12 carries score scale 23 in circular array at spaced distance inwardly adjacent the external periphery of the annulus. This scale provides 48 equally spaced indicators each 7° and 20' in annular distance apart. These plural indicators are numbered consecutively 66 through 113 and constitute an indication of a golfer's score.

The annular relationship and configuration of spur 18 and handicap scale 19 on handicap disc 11 and notches 22 and score scale 23 on annular score disc 12 is more essential. Preferably, though not necessarily, the apex of the spur and notches 22 are radially coincident with one of the scale indicators on the disc upon which that element is carried. If this be the case, the apex of spur 18 should be radially coincident with the zero index of handicap scale 19 on the handicap disc, this scale should increase numerically in the same circular direction as that in which scale 23 of the annular score disc increases. With this arrangement then the plurality of notches 22 in score disc 12 should be radially coincident with each of the scale indicators. Generally there may be one notch for each indicator, though in normal golf some of these notches in higher ranges are never used.

Faceplate 13 is a planar circular disc with medial axially aligned hole 24 to rotatably mount upon the axle element to allow relative rotary motion. Radially coincident inner handicap port 25 and outer score port 26 are defined in the plate inwardly adjacent outer periphery 27. Each of these ports are of such size and positioning that one of the indicator marks and associated numbers of scales 19, 23 may be viewed therethrough. Radially outward of the two ports 25, 26 is faceplate tab 28 to aid in manually manipulating the angular orientation of the faceplate to a particular numerical situation.

Axle element 14 comprises headed screw 29 having some means to aid its manipulation as in this instance slot 30, threadedly engaged in knurled cap 31 having inwardly projecting cylindrical body 32 so configured as to rotatably mount the several discs 10, 11, 12, 13 by extending through the holes 15, 16, 24 and therebetween. Friction between the adjacent surfaces of the several discs may be adjusted by tightening the screw 29 in the cap 31. Preferably in assembling the various elements washer 33 is interposed between adjacent surface of handicap disc 11 and faceplate 13 to allow more ready motion therebetween with less face wear on the surfaces of handicap disc 11 and scoring disc 12 tending to remove the scales thereon.

Having thusly described the structure of my invention its use may now be understood.

Figure 2:
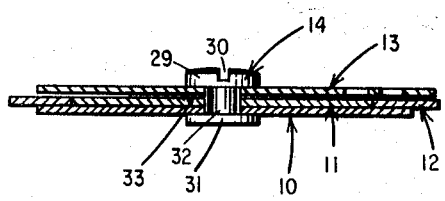
FIG. 2 is a diametric cross-sectional view of my invention assembled for use.
Figure 3:
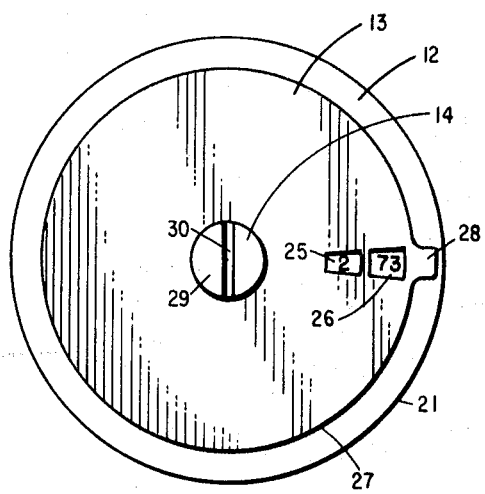
FIG. 3 is an orthographic plan view of my assembled invention.

Firstly a handicapping device is formed according to the foregoing specification and assembled as indicated in FIGS. 1 and 2 with the several discs in rotatable adjacency. Axle 14 is then loosened so that handicap disc 11 may be moved angularly relative score annulus 12 and it is moved (with scale arrangement specified) until spur 18 of the handicap disc is opposite the indicator mark on the score annulus that indicates the par score for the particular course under consideration. The spur then is disposed in the notch radially associated with the particular score and axle element 14 tightened to maintain the two discs in this angular relationship.

In this condition then the outer periphery of the score annulus may be held in one end and the faceplate manipulated manually by aid of tab 28 by the other hand to move the faceplate radially relative the handicap disc and score annulus until such time as a golfer's particular score shot on the course is located under the outer score port. In this condition the handicap of that particular golfer will be shown in the inner handicap port. In similar fashion, a golfer's expected score on a particular course with a given handicap could be determined in reverse fashion by setting the dials as previously stated for the par of the course and locating the golfer's handicap on the inner handicap port to read the expected score in the outer score port.

It is to be particularly noted that in using my invention handicap disc 11 and score annulus 12 are maintained in mechanically rigid angular relationship during normal operation of the device to prevent any possible errors caused by slippage such as might occur in a frictional-type communication. It is further to be noted that the device may still be readily set to a different score without tools or intricate manipulation and that the entire device is of an extremely simple, durable nature.

The foregoing description of my invention is necessarily of a detailed nature so that a specific embodiment of it might be set forth as required, but it is to be understood that various modifications of detail, rearrangement and multiplication of parts may be resorted to without departing from its spirit, essence, or scope.

Having thusly described my invention, what I desire to protect by Letters Patent, and what I claim is:

1. A golf-handicapping device comprising in combination:
   a planar circular back disc having a medial hole for rotatable mounting;
   a smaller planar handicap disc in surface adjacency and having a medial hole for mounting with a spur in the periphery thereof, a circular scale thereon immediately inwardly adjacent the periphery, the scale being divided into equally sized parts and said spur projecting radially outwardly from the disc periphery;
   a score annulus having an internal peripheral diameter to fit immediately outwardly adjacent the external diameter of the handicap disc, having a plurality of notches about the inner peripheral surface each adapted to receive the spur of the handicap disc and a circular scale on the upper face immediately inwardly adjacent the external periphery with plural indicators equally angularly spaced;
   a circular, planar faceplate having a medial hole for rotatable mounting and defining a radially coincident inner handicap port and outer score port adapted to exhibit respectively the scale indicators of the handicap disc and annular score disc and means to aid manual manipulation of the faceplate for angular position;
   and a compound axle rotatably joining the back disc, handicap disc and faceplate.

2. The invention of claim 1 wherein the spur of the handicap disc is radially coincident with one of the indicator marks of the handicap disc scale and each of the plurality of notches of the score annulus is radially coincident with one of the indicator marks of the score annulus scale.

3. The invention of claim 2 wherein the scale on the handicap disc is a circle divided into 48 equal parts numbered consecutively 0,1,2,2,3,4,5,6,7,8,9,10,11,12,13,14,14,15,16,17,18,19,19,20,21,22,23,24,25,25,26,27,28,29,30,31,32,33,34,35,36,36,37,38,39,40, and 41 and the scale on the score annulus is a circle divided into 48 equal angular parts numbered consecutively 66 through 113, inclusive, with the spur 18 of the handicap disc radially coincident with the zero indicator of the handicap scale.

* * * * *